United States Patent
Miyata (10) Patent No.: US 8,521,913 B2
(45) Date of Patent: Aug. 27, 2013

(54) INFORMATION PROCESSING DEVICE, INFORMATION PROCESSING SYSTEM PROVIDED WITH THE SAME, AND COMPUTER READABLE MEDIUM FOR THE SAME

(75) Inventor: Yuji Miyata, Kitanagoya Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 145 days.

(21) Appl. No.: 12/710,749

(22) Filed: Feb. 23, 2010

(65) Prior Publication Data

US 2010/0250787 A1    Sep. 30, 2010

(30) Foreign Application Priority Data

Mar. 26, 2009   (JP) .................................. 2009-076796

(51) Int. Cl.
*G06F 3/00* (2006.01)

(52) U.S. Cl.
USPC ............................................................ 710/5

(58) Field of Classification Search
USPC ............................................................ 710/5
See application file for complete search history.

(56) References Cited

U.S. PATENT DOCUMENTS

| | | | |
|---|---|---|---|
| 6,807,907 B2 | 10/2004 | Yamada | |
| 6,856,624 B2 * | 2/2005 | Magret | 370/392 |
| 6,976,072 B2 * | 12/2005 | Mathieson | 709/224 |
| 7,209,259 B2 * | 4/2007 | Tomita et al. | 358/1.18 |
| 7,240,188 B2 | 7/2007 | Takata et al. | |
| 7,286,252 B2 | 10/2007 | Kawabuchi et al. | |
| 7,426,633 B2 * | 9/2008 | Thompson et al. | 713/2 |
| 7,554,967 B1 * | 6/2009 | Varadhan et al. | 370/352 |
| 2002/0134268 A1 * | 9/2002 | Yamada | 101/484 |
| 2002/0144023 A1 * | 10/2002 | Kawabuchi et al. | 710/5 |
| 2003/0187978 A1 | 10/2003 | Nakamura et al. | |
| 2005/0052660 A1 * | 3/2005 | Sabbagh et al. | 358/1.1 |
| 2006/0015861 A1 | 1/2006 | Takata et al. | |
| 2008/0028387 A1 * | 1/2008 | Nakagawa et al. | 717/172 |
| 2009/0055912 A1 * | 2/2009 | Choi et al. | 726/6 |
| 2009/0055914 A1 * | 2/2009 | Azami | 726/7 |
| 2009/0187646 A1 * | 7/2009 | Hokkyo et al. | 709/221 |
| 2010/0192212 A1 * | 7/2010 | Raleigh | 726/7 |

FOREIGN PATENT DOCUMENTS

| | | |
|---|---|---|
| JP | HEI 11-289563 A | 10/1999 |
| JP | 2002-287936 A | 10/2002 |
| JP | 2002-297352 A | 10/2002 |
| JP | 2003-288285 A | 10/2003 |

(Continued)

OTHER PUBLICATIONS

Notification of Reasons of Rejection mailed Jan. 18, 2011 by the Japanese Patent Office, together with English-language translation.

*Primary Examiner* — Hyun Nam
*Assistant Examiner* — Eric Oberly
(74) *Attorney, Agent, or Firm* — Scully, Scott, Murphy & Presser, P.C.

(57) ABSTRACT

An information processing device is configured to be connected communicably via a network with a peripheral device that has specific identification information representing an address on the network. The information processing device includes a receiver configured to, while the peripheral device is updating firmware thereof, receive a request transmitted by a requestor to the specific identification information, and an information processor configured to perform a predetermined process in response to the request received by the receiver.

16 Claims, 8 Drawing Sheets

(56) References Cited

FOREIGN PATENT DOCUMENTS

| JP | 2003-335030 | | 11/2003 |
|---|---|---|---|
| JP | 2006-031312 | A | 2/2006 |
| JP | 2008-165653 | A | 7/2008 |
| JP | 2008-272982 | | 11/2008 |

* cited by examiner

PRINTER INFORMATION

| ITEM | SETTING VALUE |
|---|---|
| IP ADDRESS | 10.130.150.255 |
| SHEET | A4 |
| LANGUAGE | ENGLISH |
| STATUS | STANDBY |

PRINT DATA MANAGEMENT INFORMATION

| FILE NAME | USER NAME | RECEIPT TIME |
|---|---|---|
| Data 1. PRN | User A | 2009/02/05 19:37 |
| Data 2. PRN | User B | 2009/02/05 19:39 |
| Data 3. PRN | User A | 2009/02/05 19:42 |

FIG.9A

| FILE NAME | USER NAME | RECEIPT TIME |
|---|---|---|
| Data 2. PRN | User B | 2009/02/05 19:39 |
| Data 3. PRN | User A | 2009/02/05 19:42 |

FIG.9B

SETTING CHANGE FILE

| ITEM | SETTING VALUE |
|---|---|
| SHEET | LETTER |

FIG.10

INFORMATION PROCESSING DEVICE, INFORMATION PROCESSING SYSTEM PROVIDED WITH THE SAME, AND COMPUTER READABLE MEDIUM FOR THE SAME

CROSS-REFERENCE TO RELATED APPLICATION

This application claims priority under 35 U.S.C. §119 from Japanese Patent Application No. 2009-076796 filed on Mar. 26, 2009. The entire subject matter of the application is incorporated herein by reference.

BACKGROUND

1. Technical Field

The following description relates to one or more techniques for making an information processing device operate, which device is connected communicably via a network with a peripheral device that has specific identification information representing an address on the network.

2. Related Art

In general, a peripheral device such as a printer is configured to execute a process in response to a request, such as a request for a printing operation or an inquiry about status information that is issued by a host computer connected with the peripheral device via a network. However, the peripheral device cannot respond to the request from the host computer while updating firmware thereof.

To solve the above problem, a printer has been proposed which has a controller capable of communicating during updating of firmware of the printer. The printer is configured to provide status information in response to receipt of an inquiry about a status of the printer from a host computer during updating of the firmware.

SUMMARY

However, the aforementioned printer has to be provided with the special controller to accept the inquiry from the host computer during updating of the firmware.

Aspects of the present invention are advantageous to provide one or more improved techniques that allow a peripheral device, without having to have special hardware, to accept a request issued thereto even while updating firmware thereof.

According to aspects of the present invention, an information processing device is provided which is configured to be connected communicably via a network with a peripheral device that has specific identification information representing an address on the network. The information processing device includes a receiver configured to, while the peripheral device is updating firmware thereof, receive a request transmitted by a requestor to the specific identification information, and an information processor configured to perform a predetermined process in response to the request received by the receiver.

According to aspects of the present invention, further provided is an information processing system which includes a peripheral device that has specific identification information representing an address on a network, and an information processing device configured to be connected communicably via the network with the peripheral device, the information processing device comprising, a receiver configured to, while the peripheral device is updating firmware thereof, receive a request transmitted by a requestor to the specific identification information, and an information processor configured to perform a predetermined process in response to the request received by the receiver.

According to aspects of the present invention, further provided is a computer readable medium having computer readable instructions stored thereon, the instructions, when executed by a computer configured to be connected communicably via a network with a peripheral device that has specific identification information representing an address on the network, causing the computer to perform a receiving step of, while the peripheral device is updating firmware thereof, receiving a request transmitted by a requestor to the specific identification information, and an information processing step of performing a predetermined process in response to the request received in the receiving step.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

<Overall Configuration>

Figure 1:
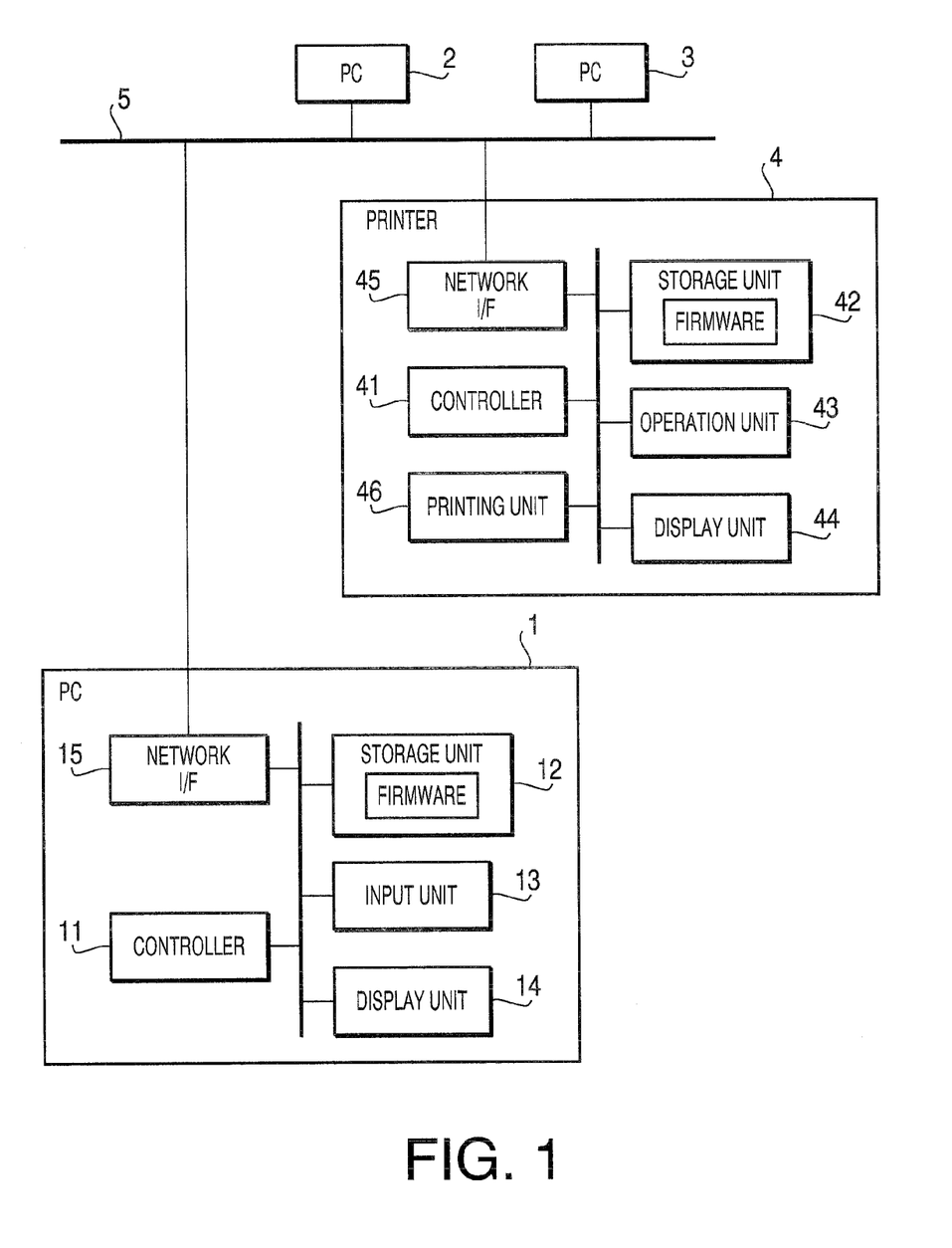
FIG. 1 schematically shows an overall configuration of an information processing system in an embodiment according to one or more aspects of the present invention.

As illustrated in FIG. 1, an information processing system of the embodiment includes personal computers 1 to 3 (hereinafter, simply referred to as PCs 1 to 3), and a printer 4.

The PCs 1 to 3 and the printer 4 are configured to communicate with each other via a Local Area Network (LAN) 5. The PC 1 includes a controller 11, a storage unit 12, an input unit 13, a display unit 14, and a network interface 15.

The controller 11 has hardware such as a CPU, a ROM, and a RAM. Further the controller 11 is configured to, based on programs and various kinds of data stored on the ROM, take overall control of elements included in the PC 1 and perform below-mentioned various processes such as a status monitoring process, a firmware updating process, a virtual server process, and a virtual operation screen process. It is noted that in the following descriptions, unless specified otherwise, various kinds of data are stored on the RAM.

The storage unit 12 is configured with a hard disk drive (HDD) or a non-volatile memory with a larger capacity that is provided separately from the RAM of the controller 11. The storage unit 12 is utilized for storing relatively large size of data or data which a user wishes to keep saved even when an electrical power supply thereto is blocked. In the embodiment, the storage unit 12 stores firmware data for updating firmware of the printer 4 which data is acquired from a server or a medium such as a CD.

The input unit 13 includes various input devices (not shown) such as a mouse and a keyboard for externally inputting a user command. The input unit 13 is configured to transmit, to the controller 11, information input through the various input devices.

The display unit 14 includes a liquid crystal display (LCD) on which information such as a message and a n image is displayed for the user on the basis of a command from the controller 11.

The network interface 15 is configured to control communication with the printer 4 via the LAN 5. The PC 1 previously stores IP addresses of the PCs 1 to 3 and the printer 4 connected with the LAN 5. When communicating with an external device via the network interface 15, the PC 1 specifies the external device based on the IP addresses.

It is noted that although FIG. 1 illustrates only an internal configuration of the PC 1, the PCs 2 and 3 are configured in the same manner as the PC 1.

The printer 4 includes a controller 41, a storage unit 42, an operation unit 43, a display unit 44, a network interface 45, and a printing unit 46.

The controller 41 includes hardware such as a CPU, a ROM, and a RAM. The controller 41 is configured to take overall control of elements included in the printer 4 based on programs and various kinds of data stored on the ROM. Further, the controller 41 always monitors a status of the printer 4 (e.g., toner empty or ink empty, out of paper, a paper jam, and other malfunctions). When receiving an inquiry regarding information on the status of the printer 4 (a request for transmission of status information), for instance, from the PC 1, the controller 41 transmits to the PC 1 the status information indicating the status of the printer 4.

The storage unit 42 is configured with a non-volatile memory, which stores firmware for controlling hardware of the printer 4. The operation unit 43 is an operation panel that has various switches operable by the user. The operation unit 43 is configured to transmit to the controller 41 information input through the various switches.

The display unit 44 is provided with an LCD or an LED, on which information such as a message and an image is displayed for the user on the basis of a command from the controller 41.

The network interface 45 controls communication with the PCs 1 to 3 via the LAN 5. In the meantime, the printer 4 has a function to update an IP address. Specifically, in a regular state, the printer 4 performs data communication with an IP address specific to the printer 4 (hereinafter, which may be referred to as a specific IP address). Meanwhile, before updating the firmware of the printer 4, the printer 4 performs data communication with an IP address changed in response to a command from the PC 1 (which address is not set for the other devices on the LAN5, and may hereinafter be referred to as a temporary IP address).

The printing unit 46 is configured to print out, on a sheet, an image based on print data transmitted, e.g., by the PC 1 to 3, under control by the controller 41.

(2) Processes by Controller of PC

Hereinafter, an explanation will be provided about various processes to be executed by the controller 11 of the PC 1.

(2.1) Status Monitoring Process

Figure 2:
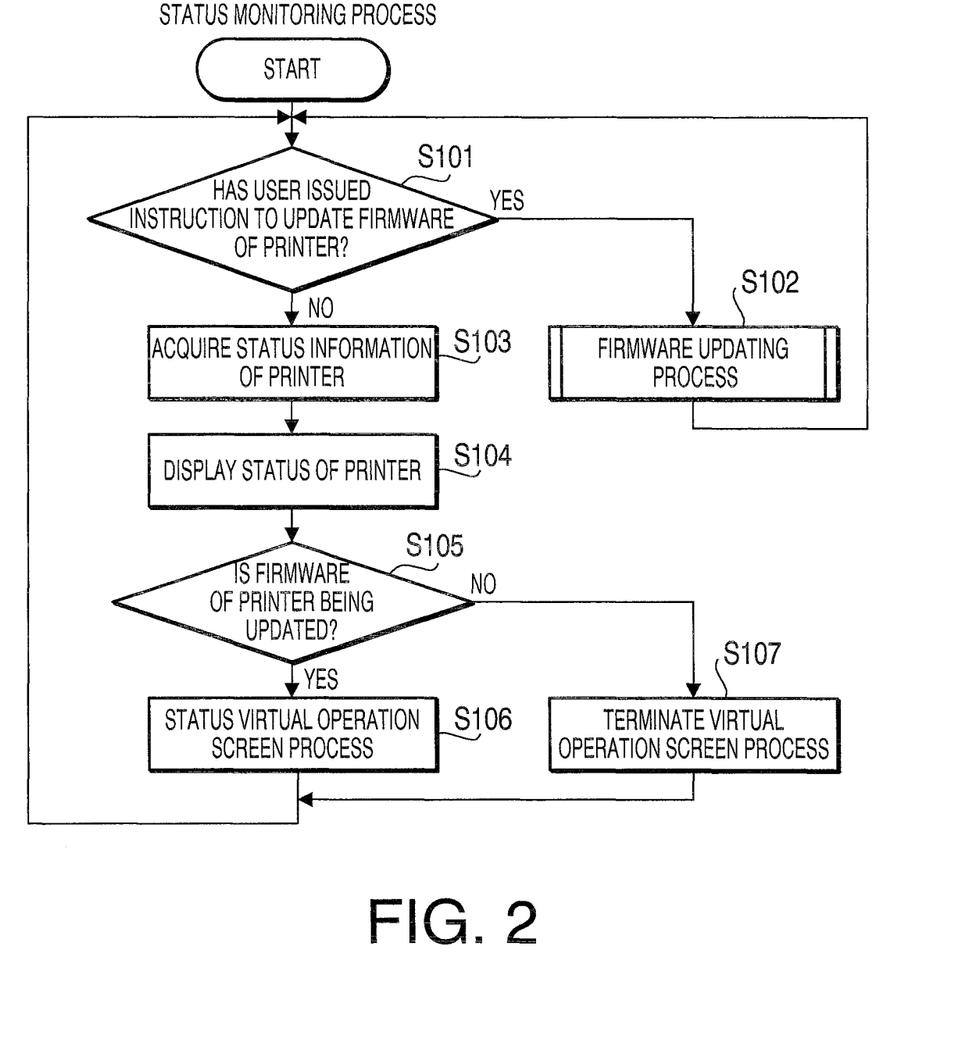
FIG. 2 is a flowchart showing a procedure of a status monitoring process in the embodiment according to one or more aspects of the present invention.

A procedure of a status monitoring process will be described with reference to FIG. 2. The process may be adapted to be launched in response to a user manual operation or concurrently when the PC 1 is started up. Alternatively, the process may be launched as a separate process from a printer driver when print data is transmitted by the PC 1 to the printer 4.

Figure 3A:
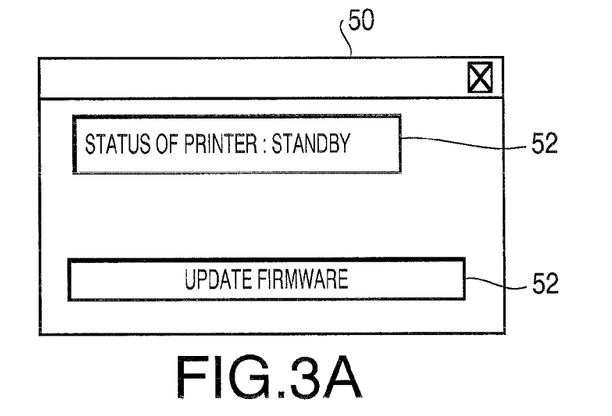
FIGS. 3A and 3B exemplify displays on a status monitor screen in the embodiment according to one or more aspects of the present invention.
Figure 3B:
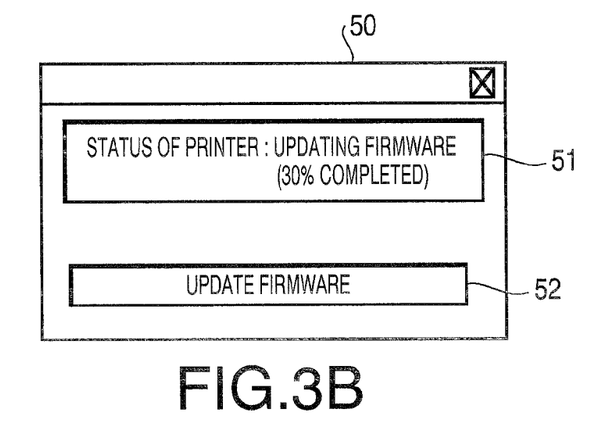

During execution of the status monitoring process, the controller 11 displays, on the display unit 14, a status monitor screen 50 as illustrated in FIGS. 3A and 3B. On the status monitor screen 50, an information window 51 for showing status information of the printer 4 and a firmware updating button 52 are placed.

In the status monitoring process, the controller 11 initially determines whether the user has issued an instruction to update the firmware through the firmware updating button 52 (S101). When the user has issued an instruction to update the firmware through the firmware updating button 52 (S101: Yes), the controller 11 performs a firmware updating process (S102). In the firmware updating process, the controller 11 updates the firmware of the printer 4 and accepts requests for processes to be executed during the updating of the firmware. The firmware updating process will be described in detail later. When the firmware updating process is terminated, the controller 11 goes back to S101.

Meanwhile, when the user has not issued an instruction to update the firmware through the firmware updating button 52 (S101: No), the controller 11 acquires information on a status of the printer 4 (status information of the printer 4) (S103). In this step, specifically, the controller 11 transmits a request for transmission of status information to the specific IP address of the printer 4, and acquires the status information output from the printer 4.

When the printer 4 is in the process of updating the firmware, and a below-mentioned virtual server is activated in any of the PCs 1 to 3, the aforementioned request for transmission of status information is transmitted to the virtual server. In this case, the sending source of the request acquires, from the virtual server, status information (the status information acquired before updating of the firmware of the printer 4, information that the printer 4 is in the process of updating the firmware thereof, and information on a progress on the updating).

Subsequently, the controller 11 displays, on the information window 51 of the status monitor screen 50, the status of the printer 4 acquired in S103 (S104). When determining based on the acquired status of the printer 4 that the printer 4 is in such a normal state that the printer 4 can perform printing, the controller 11 displays "STANDBY" on the information window 51 as illustrated in FIG. 3A. Meanwhile, when determining that the printer 4 is in an abnormal state, the controller 11 displays concrete information regarding the abnormality on the status monitor screen 50.

Additionally, when the printer 4 is in the process of updating the firmware thereof, the controller 11 displays, on the status monitor screen 50, information that the printer 4 is in the process of updating the firmware and the progress on the updating. For example, as illustrated in FIG. 3B, messages such as "UPDATING FIRMWARE" and "30% COMPLETED" are shown on the information window 51. It is noted that the display regarding the updating of the firmware is shown alternating with another status (for instance, switching the display every one second).

Figure 4:
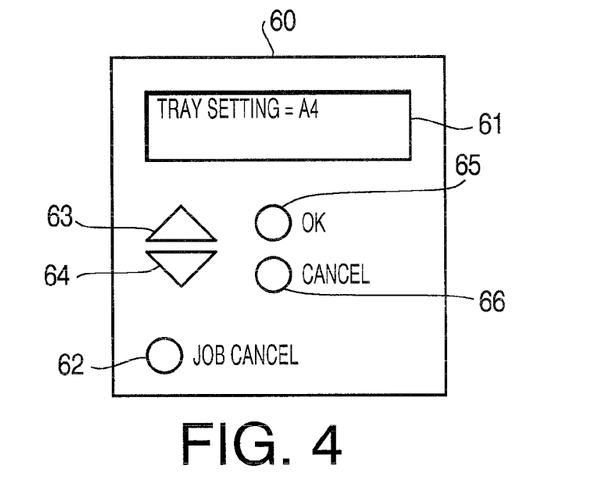
FIG. 4 is an illustration showing a virtual operation screen in the embodiment according to one or more aspects of the present invention.

Next, the controller 11 determines, based on the status information of the printer acquired in S103, whether the printer 4 is in the process of updating the firmware thereof (S105). When the printer 4 is in the process of updating the firmware (S105: Yes), the controller 11 starts a virtual operation screen process (S106). In the virtual operation screen process, the controller 11 displays a virtual operation screen 60 on the display unit 14. As shown in FIG. 4, the virtual operation screen 60 is configured to imitate the operation unit 43 of the printer 4. The user can input an instruction to cancel an already-requested print job and an instruction to change a setting through the virtual operation screen 60. The virtual operation screen process will be described in detail later. After the step S106, the controller 11 goes back to S101.

Meanwhile, when the printer 4 is not in the process of updating the firmware (S105: No), the controller 11 terminates the virtual operation screen process (S107). Thereby, the virtual operation screen 60 is deleted from on the display unit 14. When the virtual operation screen process is not started (i.e., when the status where the printer 4 is not in the process of updating the firmware continues), the controller 11 goes back to S101 without performing any operation in S107.

(2.2) Firmware Updating Process

Figure 5:
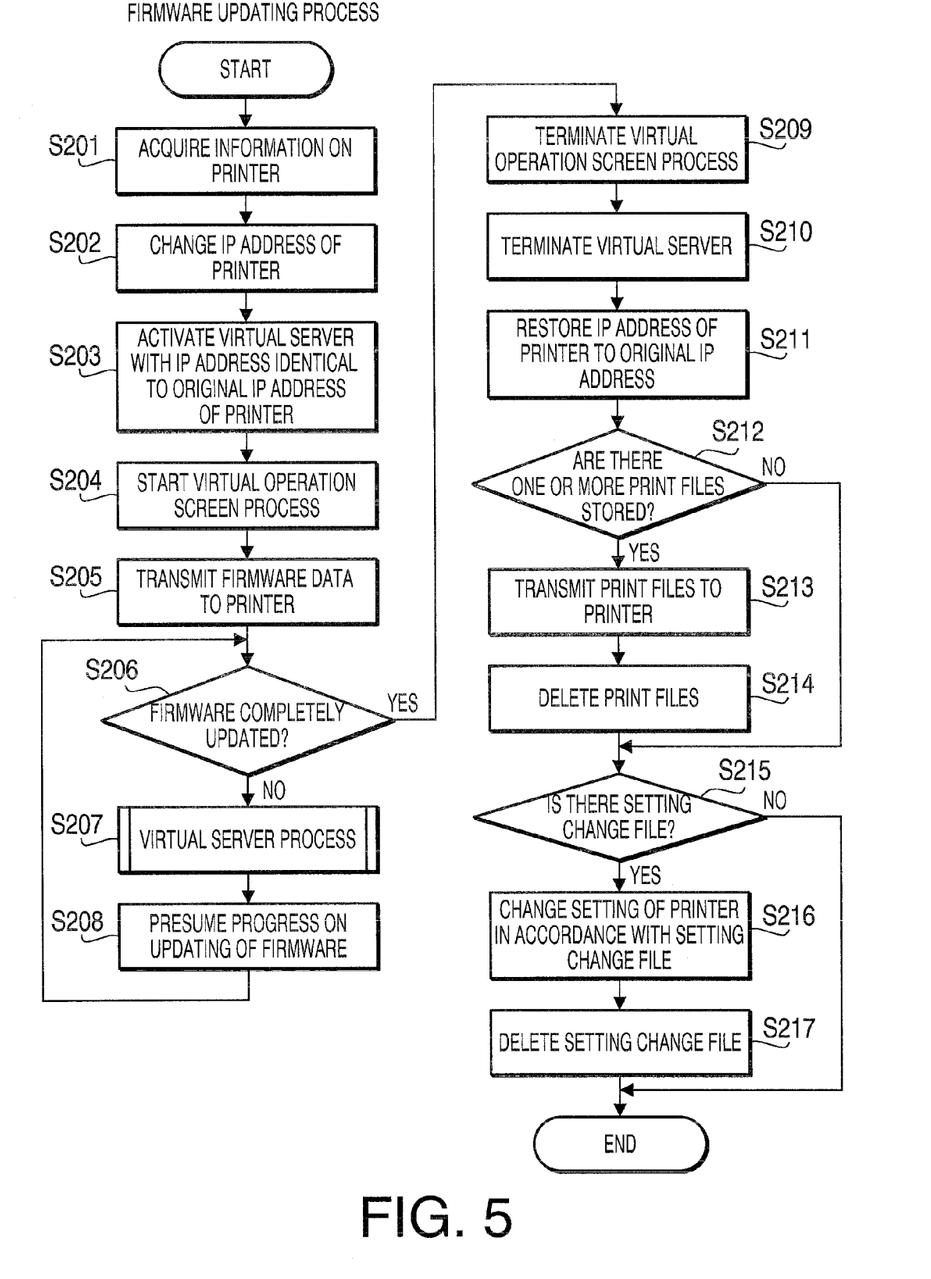
FIG. 5 is a flowchart showing a procedure of a firmware updating process in the embodiment according to one or more aspects of the present invention.

A procedure of the firmware updating process will be set forth referring to FIG. 5. The firmware updating process is executed in S102 of the status monitoring process.

In the firmware updating process, the controller 11 first acquires information on the printer 4 (S201). In the step S201, the controller 11 issues to the printer 4 a request for transmission of the status information and setting information (e.g., settings of a sheet and a language), and receives those kinds of information from the printer 4. In addition, the controller 11 selects and acquires an IP address of the printer 4 from the identification information of each device on the LAN 5 which information is owned by the PC 1, and sets the acquired IP address of the printer 4 as a specific IP address used in the following processes.

Figure 6:
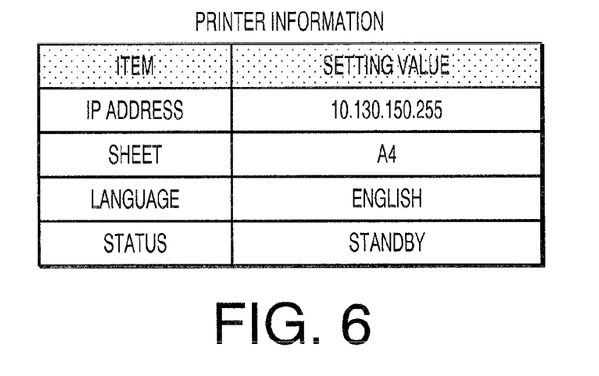
FIG. 6 exemplifies printer information created in S201 of the firmware updating process in the embodiment according to one or more aspects of the present invention.

Moreover, in S201, the controller 11 creates a data group of printer information that contains the aforementioned kinds of acquired information as shown in FIG. 6. In the following processes, when using the specific IP address, the setting information, and/or the status information, the controller 11 acquires the information to be used referring to the printer information.

Subsequently, the controller 11 changes the IP address of the printer 4 (S202). In the step S202, specifically, the controller 11 instructs the printer 4 to replace the specific IP address with the temporary IP address. Thereby, the controller 11 changes the IP address of the printer 4.

Figure 7A:
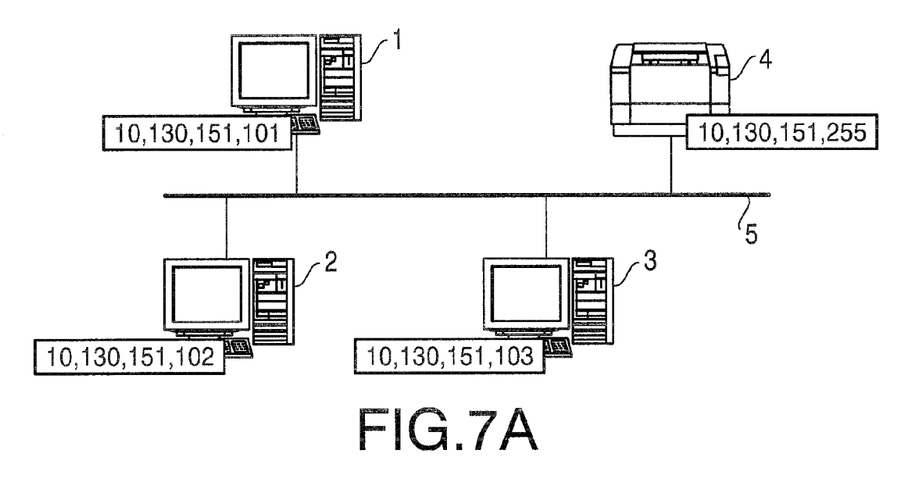
FIG. 7A shows IP addresses assigned to devices of the information processing system in a regular state in the embodiment according to one or more aspects of the present invention.
Figure 7B:
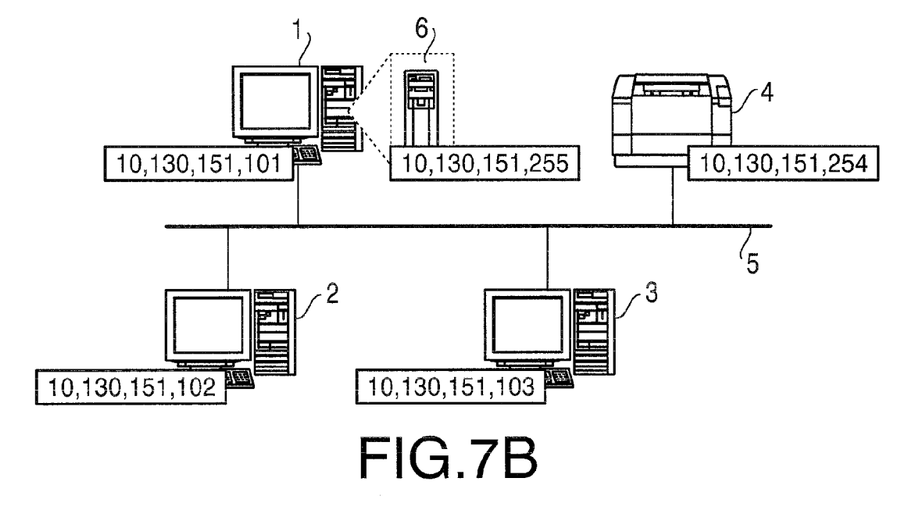
FIG. 7B shows IP addresses assigned to the devices of the information processing system with a virtual server being activated in the embodiment according to one or more aspects of the present invention.

FIGS. 7A and 7B illustrate configurations of the information processing system with IP addresses. FIG. 7A shows a regular state before the IP address of the printer 4 is changed. In FIG. 7A, the PCs 1 to 3 use respective different IP addresses, and the IP address (the specific IP address) of the printer 4 is represented as "10. 130. 150. 255."

After the IP address of the printer 4 has been changed, as shown in FIG. 7B, the printer 4 has an IP address of "10. 130. 150. 254" as the temporary IP address. A concrete value of the temporary IP address may be set by the controller 11 or the printer 4. When the printer 4 sets the temporary IP address, the printer 4 notifies the PC 1 of the set value of the temporary IP address.

Next, the controller 11 activates a virtual server 6 that performs communication using the same IP address as the original IP address of the printer 4 (i.e, the specific IP address) (S203). The virtual server 6 is configured on the PC 1 as a virtual server which has a function to perform communication with each device connected to the LAN 5 using the specific IP address. During an period that the virtual server 6 is active, all data transmitted to the IP address "10. 130. 150. 255" is received by the virtual server 6.

Subsequently, the controller 11 starts a virtual operation screen process corresponding to the printer 4 (S204). In the virtual operation screen process, the controller 11 displays a virtual operation screen 60 on the display unit 14. The virtual operation screen 60 is equivalent to the screen displayed in the aforementioned step S106. The virtual operation screen process will be described in detail later.

Then, the controller 11 transmits, to the printer 4, firmware for updating the current firmware of the printer 4 (S205). In the step S205, the controller 11 transmits the firmware stored on the storage unit 12 to the temporary IP address of the printer 4 set in S202. Since the printer 4 begins to update the current firmware after receiving the firmware from the controller 11, the printing function and the communication function of the printer 4 are not available during the updating.

It is noted that the firmware for updating to be transmitted to the printer 4 may be acquired from a server on an external network (not shown) or a storage medium such as a USB memory. Alternatively, the controller 11 may request a server on an external network to transmit the firmware to the printer 4.

Subsequently, the controller 11 determines whether the updating of the firmware is completed (S206). In the step S206, the controller 11 checks whether the controller 11 can resume communication with the printer 4. When the controller 11 can resume communication with the printer 4, the controller 4 determines that the updating of the firmware is completed (S206: Yes). Alternatively, the printer 4 may transmit a signal indicating that the updating of the firmware is completed, and the controller 11 may determine that the updating of the firmware is completed, in response to receipt of the signal.

When the updating of the firmware is not completed (S206: No), the controller 11 performs a virtual server process (S207). In the step S207, the controller 11 receives a request for a process or transmits predetermined data as the virtual server 6.

In the embodiment, the virtual server 6 receives any one of a request for transmission of the status information, an instruction to change a setting for the printer 4, the print data (the request for printing), and an instruction to cancel the print job. When receiving the request for transmission of the status information, the virtual server 6 transmits the status information acquired in S201 to a PC that is a sending source of the request. When receiving the print data or the instruction to change a setting for the printer 4, the virtual server 6 saves the received data as a print file or a setting change file, respectively. When receiving the instruction to cancel the print job, the virtual server 6 deletes the print file saved. A detailed explanation about the virtual server process will be provided later.

Next, the controller 11 presumes a progress on the updating of the firmware (S208). The progress on the updating of the firmware can be presumed based on a size and/or data of the firmware transmitted in S205. For example, in the case where the firmware transmitted in S205 has such a size and/or data that it would take ten minutes to replace the current firmware with the transmitted firmware, when three minutes have elapsed since the start of the updating, the progress on the updating can be presumed to be 30%.

It is noted that the controller 11 outputs the presumed progress on the updating of the firmware along with the status information acquired in S201 when a request for the status information is issued in the status monitoring process by another PC (the PC 2 or 3). After that, the controller 11 goes back to S206.

The aforementioned steps S206 to S208 are repeated until the updating of the firmware is completed. When the updating of the firmware is completed (S206: Yes), the controller 11 goes to S209.

In S209, the controller 11 terminates the virtual operation screen process launched in S204 (S209). Thereby, the virtual operation screen 60 is deleted from the display unit 14. Thereafter, the controller 11 terminates the virtual server 6 activated in S203 (S210). In the step S210, the controller 11 deletes the specific IP address from addresses for the PC 1 to receive a request for a process, and thereby stops receipt of a request for a process transmitted to the specific IP address. Further, the controller 11 deletes the specific IP address from the printer information shown in FIG. 6.

Subsequently, the controller 11 restores the IP address of the printer 4 to the original one (S211). Specifically, the controller 11 instructs the printer 4 to change the IP address of the printer 4 from the temporary IP address to the specific IP address. Thereby, the IP address of the printer 4 is restored to the specific IP address.

Next, the controller 11 checks whether there are one or more print files stored in the PC 1 (S212). Specifically, in S212, the controller 11 determines whether one or more print files corresponding to the print data (the request for printing) received by the virtual server 6 are saved in the virtual server process in S207. When there is no print file (S212: No), the controller 11 goes to S215.

Meanwhile, when there are one or more print files (S212: Yes), the controller 11 transmits the print files to the printer 4 in the received order (S213). Then, the controller 11 deletes the print files stored in the PC 1 (S214). The printer 4 performs printing operations based on the print files received from the PC 1. It is noted that the received order is determined with reference to below-mentioned print data management information. Thereafter, the controller 11 advances to S215.

Next, the controller 11 checks whether there is a setting change file stored in the PC 1 (S215). Specifically, in S215, the controller 11 determines whether a setting change file, which represents the data of the instruction to change the settings that is received by the virtual server 6, is saved in the virtual server process in S207. When there is no setting change file (S215: No), the controller terminates the firmware updating process, and goes back to the status monitoring process.

Meanwhile, when there is a setting change file (S215: Yes), the controller 11 changes a setting for the printer 4 in accordance with the setting change file (S216). Thereafter, the controller 11 deletes the setting change file stored in the PC 1 (S217). Thereafter, the controller 11 terminates the firmware updating process, and goes back to the status monitoring process.

(3.3) Virtual Server Process

Figure 8:
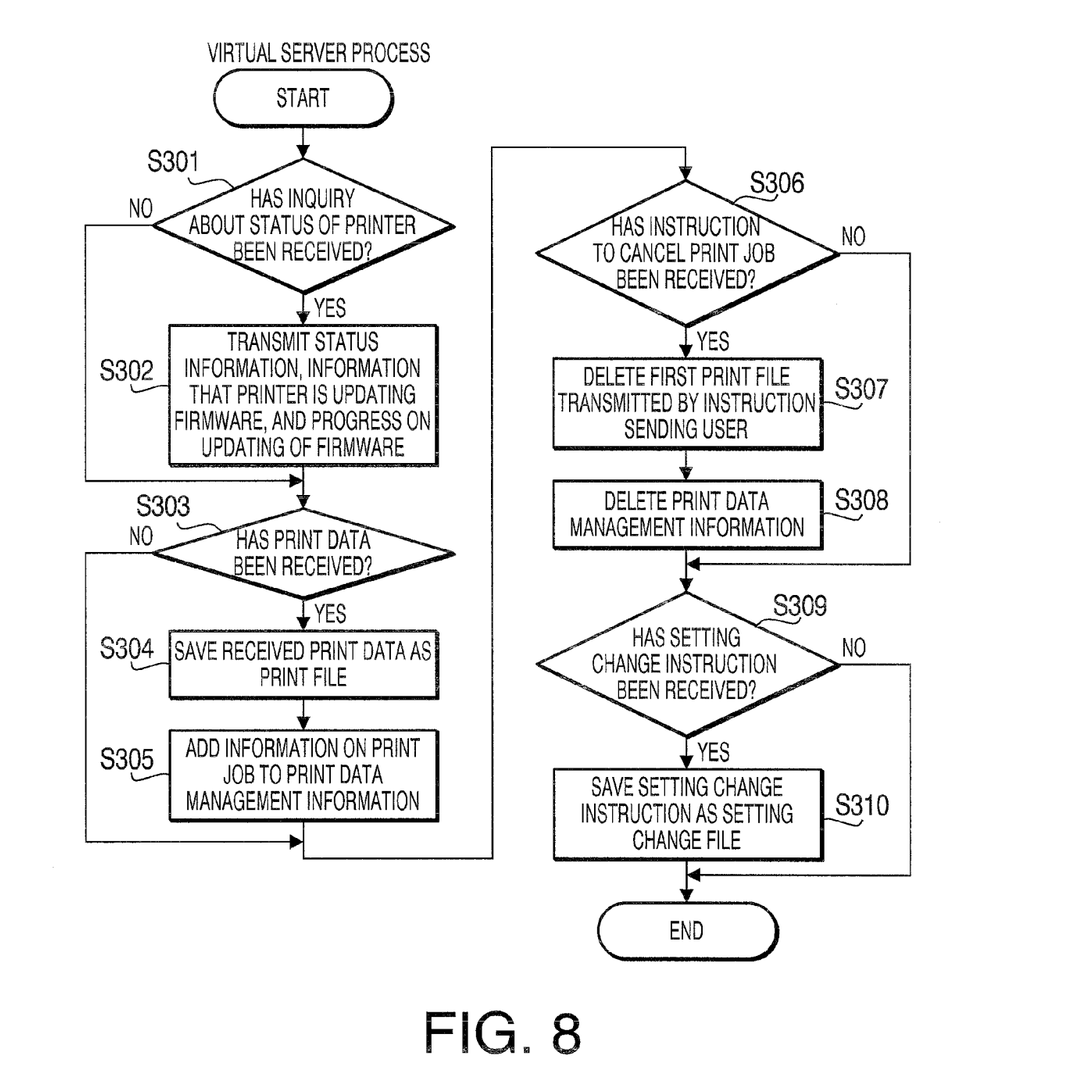
FIG. 8 is a flowchart showing a procedure of a virtual server process in the embodiment according to one or more aspects of the present invention.

A procedure of the virtual server process to be executed in S207 of the firmware updating process will be described with reference to FIG. 8.

In the virtual server process, the controller 11 first determines whether the controller 11 has received an inquiry about the status information (a request for transmission of the status information) (S301). When the controller 11 has not received an inquiry about the status information (S301: No), the controller 11 goes to S303.

Meanwhile, when the controller 11 has received an inquiry about the status information (S301: Yes), the controller 11 transmits, to a PC as the sending source of the inquiry, information such as the status information acquired in S201, information that the printer 4 is in the process of updating the firmware, and information on the progress on the updating of the firmware (S302). After that, the controller 11 goes to S303.

Figure 9A:
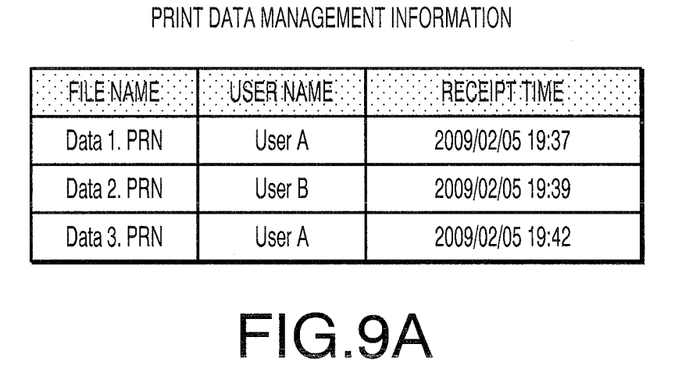
FIGS. 9A and 9B exemplify print data management information in the embodiment according to one or more aspects of the present invention.
Figure 9B:
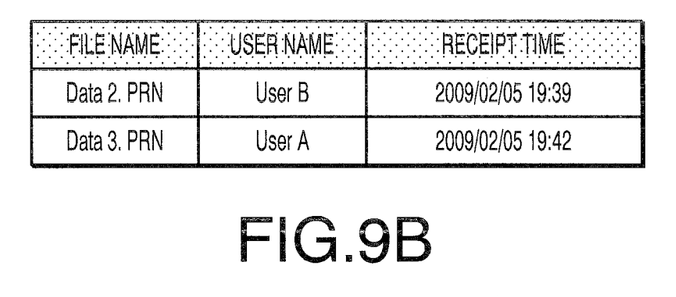

Subsequently, the controller 11 determines whether the controller 11 has received print data (with a request for printing) (S303). When the controller 11 has not received print data (S303: No), the controller 11 goes to S306. Meanwhile, when the controller 11 has received print data (S303: Yes), the controller 11 saves the received print data with the request for printing as a print file (S304). Then, the controller 11 adds information on the print job to print data management information (S305). As illustrated in FIGS. 9A and 9B, the print data management information includes a file name of the print file saved in S304, a user name as a sending source of the print data determined in S303 to have been received (which user name may be replaced with anything specifying the sending source of the print data, such as an identification name of the sending source PC and an account of the login user), and a receipt time representing a time when the controller 11 has received the print data. Thereafter, the controller 11 goes to S306.

Next, the controller 11 determines whether the controller 11 has received an instruction to cancel the print job (S306). When the controller 11 has not received an instruction to cancel the print job (S306: No), the controller 11 goes to S309. Meanwhile, when the controller 11 has received an instruction to cancel the print job (S306: Yes), the controller 11 deletes, from the print files stored in the PC 1, a first print file transmitted by a user who has issued the instruction to cancel the print job (S307). Then the controller 11 deletes corresponding information on the print job from the print data management information (S308). For example, when a user "UserA" issues an instruction to cancel the print job in a situation with the print data management information shown in FIG. 9A, the controller 11 deletes an earlier-received one of files "Data1.PRN" and "Data3.PRN" corresponding to the "UserA," i.e., the file "Data1.PRN." Consequently, the print data management information is updated as shown in FIG. 9B. Thereafter, the controller 11 goes to S309.

Figure 10:
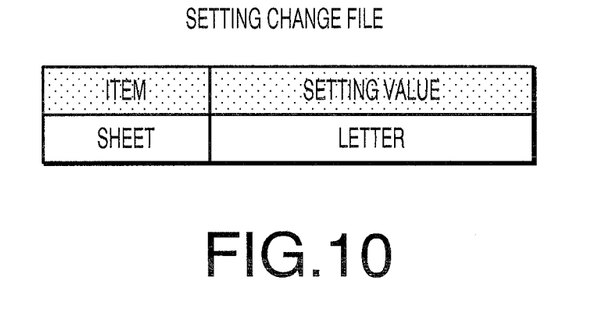
FIG. 10 exemplifies a setting change file saved in S310 of the virtual server process in the embodiment according to one or more aspects of the present invention.

Next, the controller 11 determines whether the controller 11 has received an instruction to change a setting (a setting change instruction) (S309). When the controller 11 has not received a setting change instruction (S309: No), the controller 11 terminates the virtual server process, and goes back to the firmware updating process. Meanwhile, when the controller 11 has received a setting change instruction (S309: Yes), the controller 11 saves data of the setting change instruction as a setting change file (S310). As shown in FIG. 10, the setting change file includes an item of which the setting is to be changed and a changed setting value of the item. It is noted that when the controller 11 has received a plurality of setting change instructions, the controller 11 saves a setting change file for each of the setting change instructions. Nevertheless, when the controller 11 has received a setting change instruction with the same item, of which the setting is to be changed, as an already-stored setting change file, the controller 11 overwrites the already-stored setting change file with data of the later-received setting change instruction. After S310, the controller 11 terminates the virtual server process, and goes back to the firmware updating process.

(3.4) Virtual Operation Screen Process

Figure 11:
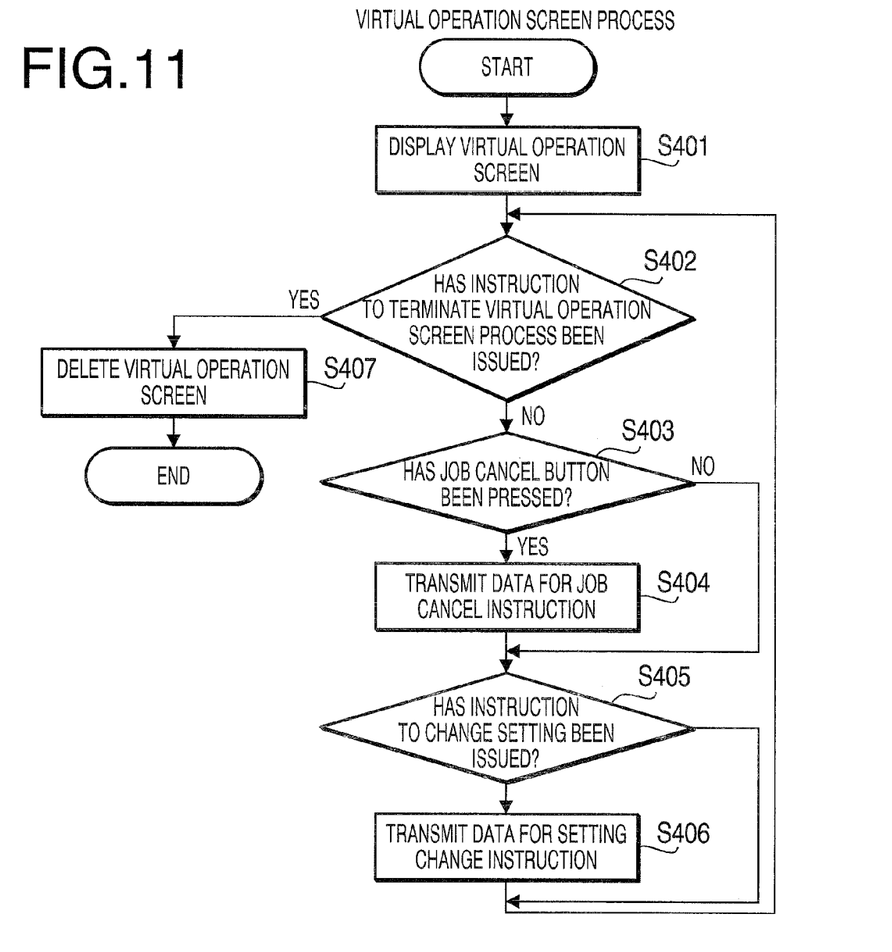
FIG. 11 is a flowchart showing a procedure of a virtual operation screen process in the embodiment according to one or more aspects of the present invention.

A procedure of the virtual operation screen process will be described with reference to FIG. 11. The virtual operation screen process is launched in S106 of the status monitoring process or in S204 of the firmware updating process and thereafter executed as a separate process from the status monitoring process and the firmware updating process.

In the virtual operation screen process, the controller 11 first displays the virtual operation screen (S401). As illustrated in FIG. 4, the virtual operation screen 60 has a display window 61 for displaying information corresponding to an operation, a "Job Cancel" button 62, an up button 63, a down button 64, an "OK" button 65, and a "Cancel" button 66.

Subsequently, the controller 11 determines whether an instruction to terminate the virtual operation screen process has been issued (S402). Specifically, in S402, when an instruction to terminate the virtual operation screen process is issued in S107 of the status monitoring process or in S209 of the firmware updating process, or when an instruction to delete the virtual operation screen 60 is input through the input unit 13, the controller 11 determines that an instruction to terminate the virtual operation screen process has been issued. When an instruction to terminate the virtual operation screen process has been issued (S402: Yes), the controller 11 deletes the virtual operation screen 60 (S407), and then terminates the virtual operation screen process.

Meanwhile, when an instruction to terminate the virtual operation screen process has not been issued (S402: No), the controller 11 determines whether the "Job Cancel" button 62 has been pressed (S403). When the "Job Cancel" button 62 has not been pressed (S403: No), the controller 11 goes to S405. Meanwhile, when the "Job Cancel" button 62 has been pressed (S403: Yes), the controller 11 transmits data for the instruction to cancel the print job (the job cancel instruction) to the specific IP address (the virtual server 6) (S404).

Figure 12:
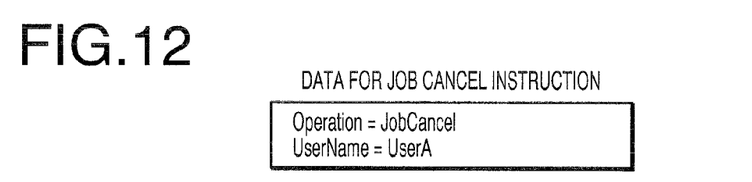
FIG. 12 exemplifies data for a job cancel instruction in the embodiment according to one or more aspects of the present invention.

As exemplified in FIG. 12, the data for the job cancel instruction contains a user name of the user who is operating the virtual operation screen 60. Therefore, the controller 11 can identify the user and cancel the print job for the identified user. Thereafter, the controller 11 goes to S405.

Subsequently, the controller 11 determines whether an instruction to change a setting has been issued (S405). The instruction to change a setting is selected and determined using the buttons on the virtual operation screen 60, i.e., the up button 63, the down button 64, the "OK" button 65, and the "Cancel" button 66. When an instruction to change a setting has not been issued (S405: No), the controller 11 goes back to S402.

Figure 13:
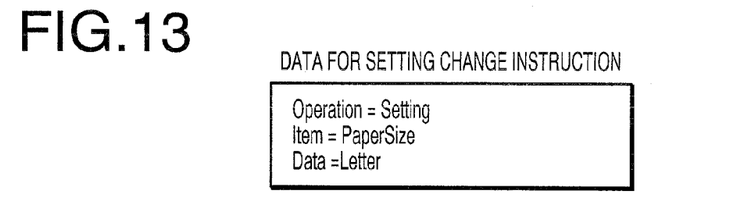
FIG. 13 exemplifies data for a setting change instruction in the embodiment according to one or more aspects of the present invention.

Meanwhile, when an instruction to change a setting has been issued (S405: Yes), the controller 11 transmits the data for the setting change instruction to the specific IP address (S406). As exemplified in FIG. 13, in the data for the setting change instruction, an instruction to configure a sheet size setting to a letter-sized sheet is written.

After S406, the controller 11 goes back to S402.

(4) Effects

In the information processing system configured as above, during updating of the firmware of the printer 4, the PC 1 receives, by the virtual server 6 activated therein, a request for a process that is transmitted, by another PC such as the PC 2 and the PC 3 connected with the LAN 5, to the specific IP address (i.e., to the printer 4). Then, the PC 1 executes a process corresponding to the received request.

Accordingly, even during updating of the firmware of the printer 4, the virtual server 6 (i.e., the PC 1, the same will apply to the following description) can receive a request for a process issued to the printer 4.

For example, when print data or an instruction to change a setting for the printer 4 is transmitted to the printer 4 during updating of the firmware of the printer 4, the virtual server 6 receives and saves the print data or the setting change instruction. When the updating of the firmware of the printer 4 is completed, the virtual server 6 then transmits the print data or the setting change instruction to the printer 4.

097 Therefore, the information processing system of the embodiment can make the printer 4 perform a printing operation or a setting change requested by the PC 1, 2, or 3 connected with the LAN 5, after the updating of the firmware of the printer 4 is completed. Thus, it is not required to make the requestor PC 1, 2, or 3 resend the request.

In addition, in response to an inquiry about the status information issued to the printer 4, the virtual server 6 can transmit, to the sending source of the inquiry about the status information, information that the printer 4 is in the process of updating the firmware and information on the progress on the updating of the firmware, as well as the status information acquired and stored before the updating of the firmware.

Further, the aforementioned virtual server 6 receives a request for a process issued to the specific IP address of the printer 4 which has begun to update the firmware. Therefore, the virtual server 6 can certainly receive the request transmitted by the requestor PC 1, 2, or 3 to the printer 4.

Moreover, when the updating of the firmware of the printer 4 is completed, the virtual server 6 cannot receive data transmitted to the specific IP address of the printer 4. Thus, when the printer 4 completes the updating of the firmware thereof, the printer 4 can receive a request for a process issued to the specific IP address, in the same manner as before the printer 4 begins to update the firmware thereof.

Further, when the printer 4 begins to update the firmware thereof, the PC 1 configured as above change the IP address of the printer 4 to the temporary IP address different from the original specific IP address. Hence, the printer 4 needs not receive a regular request for a process issued to the specific IP address, and can only receive a request for a process transmitted to the temporary IP address.

Specifically, the PC 1 changes the identification information of the printer 4 to the temporary IP address and thereafter sends firmware to the temporary IP address. Thus, the printer 4 is set into a state communicable only with the PC 1, and needs not meet a request for a process from another PC 2 or 3. Thereby, it is possible to certainly update the firmware of the printer 4.

Further, the virtual server 6 receives a request for a process issued to the specific IP address. Therefore, by changing the identification information of the printer 4 to the temporary IP address, it is possible to avoid such a situation that there are on the LAN 5, a plurality of devices that may receive a request for a process issued to an identical IP address.

Further, the PC 1 restores the IP address of the printer 4 to the original specific IP address after the firmware of the printer 4 is completely updated. Therefore, after the firmware is completely updated, the printer 4 can receive a request for a process issued to the specific IP address in the same manner as before the updating of the firmware.

Further, the PC 1 configured as above accepts an instruction to cancel the print job and an instruction to change a setting of the printer 4 on the virtual operation screen 60 during the updating of the firmware of the printer 4.

Accordingly, even though the PC 1 cannot accept the aforementioned request for canceling of the print job or a setting change for the printer 4 in a regular manner (e.g., by operating the operation panel of the printer 4 or by a remote-control operation in the PC 1, 2, or 3), it is possible to input the request on the virtual operation screen 60.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

(5) Modifications

In the aforementioned embodiment, the updating of the firmware of the printer 4 is started in response to a command from the PC 1. Nevertheless, the printer 4 may be configured to begin to update the firmware thereof. In this case, the printer 4 may be configured to inform PCs connected with the LAN 5 about information that the printer 4 is beginning to update the firmware thereof. Further, the PC, which has received the information from the printer 4, may be configured to launch the firmware updating process shown in FIG. 5.

In the aforementioned embodiment, the firmware for updating is transmitted to the printer 4 by the PC 1. However, the printer 4 may be configured to previously store therein the firmware for updating, while the PC 1 may be configured to transmit to the printer 4 only a command to begin to update the firmware. In this case, S205 in FIG. 5 may not be executed.

In the aforementioned embodiment, an instruction to cancel the print job and an instruction to change a setting for the printer 4 are accepted on the virtual operation screen 60 during updating of the firmware of the printer 4. The virtual operation screen 60 may be configured to accept a request for a printing operation. In this case, the virtual operation screen 60 may be configured to accept an input to select an printed subject through the various buttons thereon.

In the aforementioned embodiment, when acquiring the status information of the printer 4 in S103 of the status monitoring process, the PC 1 (more specifically, the controller 11) concurrently acquires the progress on the updating of the firmware. Nevertheless, the PC 1 may be configured to execute an alternative step, instead of S103, to issue a request for transmission of only the progress on the updating of the firmware. Alternatively, the PC 1 may be configured to a separate step, from S103, to acquire only the progress on the updating of the firmware. In this case, the PC 1 may be configured to, in response to receipt of a request for transmission of the progress on the updating of the firmware in the virtual server process, transmit the progress on the updating of the firmware to the requestor of the request.

What is claimed is:

1. An information processing device configured to be connected communicably via a network with a peripheral device configured to store specific identification information representing an address on the network, the information processing device comprising:
   a processor configured to execute:
   acquiring the specific identification information from the peripheral device;
   changing the specific identification information stored within the peripheral device to temporary identification information which is different from the specific identification information;
   activating a virtual server on the information processing device, the virtual server corresponding to the acquired specific identification information;
   receiving, on the virtual server, while the peripheral device is updating firmware thereof, a request transmitted by a requestor to the specific identification information;
   performing, on the virtual server, a predetermined process in response to the request;
   transmitting, after the specific identification information stored within the peripheral device is changed to the temporary identification information, new firmware used for updating the firmware, to the changed temporary identification information;
   terminating the virtual server when the peripheral device completes updating the firmware; and
   restoring the temporary identification information of the peripheral device to the specific identification information.

2. The information processing device according to claim 1, further comprising a storage device configured to store the received request when the request is a predetermined request, wherein the processor is configured to execute, after the peripheral device completes updating of the firmware, transmitting the request stored on the storage device to the peripheral device.

3. The information processing device according to claim 1, the processor further configured to execute deleting, after the peripheral device completes updating of the firmware, the acquired specific identification information.

4. An information processing device, configured to be connected communicably via a network with a peripheral device configured to store specific identification information representing an address on the network, the information processing device comprising:

a processor configured to execute:
acquiring the specific identification information and status information about a status from the peripheral device;
changing the specific identification information stored within the peripheral device to temporary identification information which is different from the specific identification information;
activating a virtual server on the information processing device, the virtual server corresponding to the acquired specific identification information;
receiving, on the virtual server, while the peripheral device is updating firmware thereof, a request regarding the status information transmitted by a requestor to the specific identification information;
transmitting, in response to the request, the acquired status information and a status including that the peripheral device is updating firmware to the requestor;
terminating the virtual server when the peripheral device completes updating the firmware;
restoring the temporary identification information of the peripheral device to the specific identification information.

5. The information processing device according to claim 4, the processor further configured to execute storing the acquired status information in a storage device.

6. The information processing device according to claim 1, the processor further configured to execute:
presuming a progress on updating of the firmware of the peripheral device; and
transmitting, when the received request is a request for transmission of a progress on updating of the firmware of the peripheral device, the presumed progress to the requestor.

7. The information processing device according to claim 1, the controller further configured to execute;
presuming a progress on updating of the firmware of the peripheral device, based on the new firmware to be transmitted to the peripheral device; and
transmitting, when the received request is a request for transmission of a progress on updating of the firmware of the peripheral device, the presumed progress to the requestor.

8. The information processing device according to claim 1, the processor further configured to execute:
displaying, when the peripheral device is updating the firmware thereof, a screen for inputting thereon a predetermined request to the peripheral device; and
sending the predetermined request input on the screen to the specific identification information.

9. The information processing device according to claim 8, wherein the predetermined request comprises a request to change a setting for the peripheral device.

10. The information processing device according to claim 8, wherein the predetermined request comprises a request for printing to the peripheral device.

11. The information processing device according to claim 8, wherein the predetermined request comprises a request to cancel a request that has already been transmitted to the specific identification information.

12. The information processing device according to claim 2, the processor further configured to execute:
storing, when receiving a request for printing with print data from the requestor, the received request with the print data; and,
transmitting to the peripheral device, after the peripheral device completes updating of the firmware, the request for printing and the print data that are stored on the storage device.

13. The information processing device according to claim 12, the processor further configured to execute deleting, receiving a request to cancel the request for printing from the requestor, the request for printing and the print data that are stored on the storage device.

14. The information processing device according to claim 2, the processor further configured to execute;
storing, when receiving a request to change a setting for the peripheral device from the requestor, the request to change the setting for the peripheral device; and
changing, after the peripheral device completes updating of the firmware the setting for the peripheral device in accordance with the request to change the setting for the peripheral device that is stored on the storage device.

15. An information processing system comprising:
a peripheral device configured to store specific identification information representing an address on a network; and
an information processing device configured to be connected communicably via the network with the peripheral device, the information processing device comprising:
a processor configured to execute:
acquiring the specific identification information from the peripheral device;
changing the specific identification information stored within the peripheral device to temporary identification information which is different from the specific identification information;
activating a virtual server on the information processing device, the virtual server corresponding to the acquired specific identification information;
receiving, on the virtual server, while the peripheral device is updating firmware thereof, a request transmitted by a requestor to the specific identification information;
performing, on the virtual server, a predetermined process in response to the request;
transmitting, after the specific identification information stored within the peripheral device is changed to the temporary identification information, new firmware used for updating the firmware, to the changed temporary identification information;
terminating the virtual server when the peripheral device completes updating the firmware; and
restoring the temporary identification information of the peripheral device to the specific identification information.

16. A non-transitory computer readable storage device having computer readable instructions stored thereon, the instructions being configured to, when executed by a computer configured to be connected communicably via a network with a peripheral device configured to store specific identification information representing an address on the network, cause the computer to execute:
acquiring the specific identification information from the peripheral device;
changing the specific identification information stored within the peripheral device to temporary identification information which is different from the specific identification information;

activating a virtual server on the information processing device, the virtual server corresponding to the acquired specific identification information;
receiving, on the virtual server, while the peripheral device is updating firmware thereof, a request transmitted by a requestor to the specific identification information;
performing, on the virtual server, a predetermined process in response to the request;
transmitting, after the specific identification information stored within the peripheral device is changed to the temporary identification information, new firmware used for updating the firmware, to the changed temporary identification information;
terminating the virtual server when the peripheral device completes updating the firmware; and
restoring the temporary identification information of the peripheral device to the specific identification information.

* * * * *